United States Patent
Schöffler et al.

(10) Patent No.: US 11,777,436 B2
(45) Date of Patent: Oct. 3, 2023

(54) METHOD AND SYSTEM FOR A SAFETY CONCEPT FOR AN AC BATTERY

(71) Applicant: Dr. Ing. h.c. F. Porsche Aktiengesellschaft, Stuttgart (DE)

(72) Inventors: Harald Schöffler, Bretzfeld-Rappach (DE); Sven Lill, Lauffen (DE); Hermann Helmut Dibos, Remchingen (DE); Daniel Simon, Ludwigsburg (DE); Eduard Specht, Bruchsal (DE); Christian Korte, Karlsruhe (DE); Jan Kacetl, Kaiserslautern (DE); Tomas Kacetl, Kaiserslautern (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/518,722

(22) Filed: Nov. 4, 2021

(65) Prior Publication Data
US 2022/0140768 A1   May 5, 2022

(30) Foreign Application Priority Data
Nov. 5, 2020   (DE) ...................... 10 2020 129 130.2

(51) Int. Cl.
*H02P 29/02*   (2016.01)
*H02P 29/024*   (2016.01)

(52) U.S. Cl.
CPC .................................. *H02P 29/024* (2013.01)

(58) Field of Classification Search
CPC ........ H02P 29/024; H02M 1/32; H02M 1/327
See application file for complete search history.

(56) References Cited

U.S. PATENT DOCUMENTS

| | | | |
|---|---|---|---|
| 5,298,851 A * | 3/1994 | DeNardis | G05F 1/468 322/28 |
| 6,791,207 B2 * | 9/2004 | Yoshida | B60R 16/0315 307/10.6 |

(Continued)

FOREIGN PATENT DOCUMENTS

| | | |
|---|---|---|
| DE | 102009053113 A1 | 7/2010 |
| DE | 102018106162 A1 | 9/2019 |

(Continued)

OTHER PUBLICATIONS

Japanese Notice of Reasons for Refusal for Japanese Application No. 2021-178537, dated Oct. 26, 2022 with translation, 8 pages.

(Continued)

*Primary Examiner* — Rina I Duda
(74) *Attorney, Agent, or Firm* — RatnerPrestia

(57) ABSTRACT

A method for a safety concept for an AC battery, in which the AC battery includes a central controller, a plurality of battery modules which respectively have a power board with a plurality of switching states, a plurality of contactors, a plurality of current sensors, a fault loop and a high-speed bus and is connected to a traction machine. The central controller has a hardware-programmable processor unit with at least one microprocessor core on which a control program is configured to control the battery modules, the plurality of contactors and the fault loop. A state machine is implemented by the control program. The battery modules are connected, starting from the central controller, via the high-speed bus and the fault loop. If an abort fault occurs, the AC battery is changed to a safe operating state. The safe state is achieved at least by emergency disconnection of the central controller.

14 Claims, 3 Drawing Sheets

(56) References Cited

U.S. PATENT DOCUMENTS

| | | |
|---|---|---|
| 7,760,106 B2 | 7/2010 | Vandensande et al. |
| 7,999,668 B2 | 8/2011 | Cawthorne et al. |
| 8,228,037 B2 | 7/2012 | Furukawa et al. |
| 8,587,907 B2 | 11/2013 | Gaben |
| 10,985,551 B2 | 4/2021 | Gotz |
| 2011/0254502 A1* | 10/2011 | Yount .................. B60L 58/22 320/118 |
| 2013/0241496 A1 | 9/2013 | Kurayama |
| 2014/0265588 A1* | 9/2014 | McCleer ................ H02M 7/49 363/132 |
| 2017/0005371 A1 | 1/2017 | Chidester et al. |
| 2017/0120770 A1 | 5/2017 | Huynh et al. |
| 2017/0259687 A1* | 9/2017 | Chikkannanavar ........................ H02J 7/00308 |
| 2018/0056809 A1* | 3/2018 | Uchida .............. G01R 31/3835 |
| 2018/0134279 A1 | 5/2018 | Barkdull et al. |
| 2019/0288504 A1 | 9/2019 | Götz |

FOREIGN PATENT DOCUMENTS

| | | |
|---|---|---|
| EP | 3731392 A1 | 10/2020 |
| JP | 2008211962 A | 9/2008 |
| JP | 2010130768 A | 6/2010 |
| JP | 2010187467 A | 8/2010 |
| JP | 2012050156 A | 3/2012 |
| JP | 2012086645 A | 5/2012 |
| JP | 2013507895 A | 3/2013 |

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015, pp. 203-215.

Great Britain Combined Search and Examination Report for Application No. GB2115919.9, dated Apr. 29, 2022, 2 pages.

* cited by examiner

METHOD AND SYSTEM FOR A SAFETY CONCEPT FOR AN AC BATTERY

CROSS-REFERENCE TO RELATED APPLICATION

This application claims priority to German Patent Application No. 10 2020 129 130.2, filed Nov. 5, 2020, the content of such application being incorporated by reference herein in its entirety.

FIELD OF THE INVENTION

The present invention relates to a method for a safety concept for an AC battery which is used to supply a traction system of an electric vehicle. A system on which the method is carried out is also presented.

BACKGROUND OF THE INVENTION

In electric vehicles, an AC battery is used to supply energy to the traction system, wherein one or more phases for supplying alternating current to a traction machine are produced by means of continuously changing connection of DC voltage sources. If a fault, for example a cable break within the AC supply, occurs, the traction system must be able to be changed to a safe state. Such a task can be carried out, for example, by a controller of the traction system, in particular a controller of the AC battery, via contactors which are arranged inside the traction system for the purpose of interrupting or closing electrical connections between different components.

US 2017/005371 A1, which is incorporated by reference herein, describes systems and methods for storing energy for use by an electric vehicle. The systems comprise battery strings which can be connected to a vehicle energy supply independently of one another via a respective controllable switch.

US 2018/0134279 A1, which is incorporated by reference herein, comprises a battery control module and a controller. The battery control module outputs a state of charge of the battery at regular intervals of time, whereas the controller is configured, in the absence of a notification relating to the state of charge, to limit a flow of power between the battery and an electrical drive train to a limit value. In this case, the limit value results from an estimated state of charge.

US 2017/0120770 A1, which is incorporated by reference herein, discloses systems and methods for interrupting the supply between a battery and a traction system under load. The system has at least one contactor which can be opened for this purpose.

During operation of the electric vehicle, different operating states of the traction system may be desired, which operating states require a different connection of the AC battery, the traction machine and connection peripherals. Requirements imposed on the control of the contactors and the battery modules arise for a respective operating state from a respective hardware connection of components of the traction system, hazard and risk analyses and functional safety regulations, for which a safety concept is necessary.

SUMMARY OF THE INVENTION

Against this background, described herein is a method for a safety concept for an AC battery, in which, in the event of an interrupt request for providing power to the AC battery for a traction machine, the AC battery is changed to a safe state. A system on which the method is carried out is also intended to be presented.

A method for a safety concept for an AC battery is proposed, in which the AC battery is connected to a traction machine and comprises a central controller, a plurality of battery modules which are arranged in at least one string and respectively have a power board with a plurality of switching states, a plurality of contactors, a plurality of current sensors, a fault loop and a high-speed bus. The central controller has a hardware-programmable processor unit with at least one microprocessor core. On this hardware-programmable processor unit, a control program is configured to control the battery modules, the plurality of contactors and the fault loop. In this case, a state machine is implemented by means of the control program, wherein the battery modules are connected, starting from the central controller, via the high-speed bus and the fault loop. If an abort fault is detected, the AC battery is changed to a safe operating state by the central controller by virtue of each battery module being requested by the central controller via the high-speed bus to assume a "bypass" switching state by virtue of each contactor assuming a respective safety switching position and by virtue of the central controller finally being disconnected. The request for each battery module to assume the "bypass" switching state and for each contactor to assume a respective safety switching position can be effected at the same time because the request for each battery module and assumption of the "bypass" switching state take place in a microseconds range, for example, and contactors are controlled, for example, in a time range above 10 milliseconds. The state machine then remains in the safe operating state and it is possible to leave this safe operating state only by means of a restart. As a result, functional safety specifications are advantageously taken into account.

The abort fault is an event in the AC battery, in the presence of which the AC battery and its components must be immediately changed to a safe state.

A hardware-programmable processor is advantageously fully testable, with the result that incorrect control operations can be excluded in advance by means of test series. With the aid of this processor, the method according to aspects of the invention reliably assigns the respective contactor switching states, that is to say open or closed, to a respective operating state of the traction system at any time and therefore complies with all safety requirements imposed on a controlled traction system by hazard and risk analyses and functional safety.

The respective safety switching position can be different for a respective contactor. In the case of a so-called active short-circuit contactor, that is to say a contactor for an active short circuit of the traction machine, the safety switching position is therefore a closed switching position, also referred to as "normal closed" or as a "normally closed contact" by a person skilled in the art, in order to short-circuit phases of the traction machine. In contrast, for a contactor between a battery module string and a charging connection, the safety switching position means an open switching position in order to interrupt an electrical connection.

In particular for controlling a plurality of contactors which must be coordinated in terms of time and in a manner dependent on the respective operating state, a program-related hardware implementation according to the method according to aspects of the invention is advantageous since adaptations in the state machine to an overall vehicle system controlled in a program-related manner and/or to an AC battery controlled in a program-related manner, for instance a modular multilevel converter with serial and parallel connectivity, for example described in Goetz, S. M.; Peterchev, A. V.; Weyh, T., "Modular Multilevel Converter With Series and Parallel Module Connectivity: Topology and Control," Power Electronics, IEEE Transactions on, vol. 30, no. 1, pp. 203, 215, 2015. doi: 10.1109/TPEL.2014.2310225, can be carried out easily, in an uncomplicated manner and in a purely program-related manner.

In the respective battery module, the "bypass" switching state means that switches of the respective power board are switched in such a manner that a respective energy storage element arranged in the respective battery module is bypassed when current is conducted through respective battery module connections. More precisely, in the case of a configuration of a respective battery module with two input connections and two output connections, there are also two possible ways of assuming the "bypass" switching state, referred to here as "bypass+" and "bypass−". In the case of "bypass+", a polarity is retained in an assignment between the two input and output connections of the respective battery module and is swapped in the case of "bypass−". The "bypass" switching state now means, beyond the mere bypassing of the respective energy storage element, that either all battery modules are connected as "bypass−" or "bypass+" or all battery modules are connected in parallel and only a battery module closest to the traction machine (for each phase or module string) is connected either as "bypass−" or "bypass+".

In one embodiment of the method according to aspects of the invention, an abort fault is obtained if an event from the following list is present: wire break, fault loop carries a trigger, a CAN bus connected to the central controller specifies an incorrect operating state.

The respective operating state can be selected, for example, from the following list: "idle" or quiescent state, motor operation, DC voltage charging, AC voltage charging, switched off. The "idle" operating state is a safe state, that is to say the active short circuit via contactors is already present. If the CAN bus specifies an incorrect operating state, a fault message is reported to the CAN bus and a so-called "soft shutdown" is initiated. However, it is also possible to handle this process as a normal fault (play protection).

The safe operating state achieved in the case of a so-called "Quick Stop" can be assumed only from a "motor off" operating state. As a possible transition condition between these operating states, there is, for example, firstly the fact that a torque specification by a motor control unit has failed (CAN message is monitored) or, for example, secondly the fact that a motor control system cannot achieve a required torque or a required speed, for example because the motor control unit ignores predefined limits, in which case this can be tolerated only for a short time frame and the "Quick Stop" is then immediately initiated. In this case, the "Quick Stop" corresponds to zero torque control. There is no need for any additional intervention by a user in a command chain in the state machine.

In order to resume driving operation after reaching the safe operating state of the AC battery, the motor control system must be initially set to a zero value of the torque, that is to say the zero torque. In this case, there is no longer any torque at a traction machine supplied by the AC battery and the electric vehicle has come to a standstill. In order to return to the "motor" operating state from the "Quick Stop", the following conditions must all be satisfied: firstly, respective input parameters of the motor control system must be in a respective valid range, secondly a CAN message from the motor control unit must be present, thirdly the vehicle speed must have been at zero, and fourthly a so-called fatal error (IRQ) must not have been triggered.

An important function when carrying out the method according to aspects of the invention in this case includes, in the central controller, a subprogram of the control program which communicates a respective control command via the high-speed bus and is referred to below as HSB_CMD_TX. HSB_CMD_TX is programmed, for example, as an IP core in VHDL and is executed on the hardware-programmable processor unit. HSB_CMD_TX therefore monitors the fault loop for any occurrence of a trigger which indicates the abort fault. The trigger may be indicated, for example, by a voltage drop in the fault loop, for example by virtue of interruption (opening of a switch) of the fault loop which has a voltage in the fault-free case, wherein the switch is controlled by a sensor. For this purpose, HSB_CMD_TX provides the hardware-programmable processor unit with an input for the fault loop. Furthermore, HSB_CMD_TX can provide the hardware-programmable processor unit with a trigger signal input for further monitoring operations and/or a software interface to the at least one microprocessor core as a further trigger input. If one of the aforementioned trigger signal inputs were to indicate the abort fault, a so-called abort fault bit would be set in a broadcast message from the HSB_CMD_TX (to all battery modules), with the result that all battery modules simultaneously change to the "bypass" switching state. If the abort fault occurs in an individual string of a plurality of strings (for example three in the case of three-phase current) of battery modules, this shows a mechanism of how an abort fault in the individual string can be mirrored in all strings for a safe operating state of the AC battery. Conversely, an interrupt on the microprocessor core also results in the same behavior as when an abort fault occurs, and the AC battery is transferred to a safe operating state, wherein a state machine implemented on the microprocessor core is also controlled to a fault state, for example, and is protected against being switched on again, with the result that a restart is required.

A possible scenario for the central controller when an abort fault occurs is as follows: the "bypass" broadcast message is sent to all battery modules. This advantageously means that respective switching positions are simultaneously transmitted to all battery modules by means of the "bypass" broadcast message, that is to say all battery modules are either connected as "bypass−" or "bypass+", for example, or all battery modules are connected in parallel and only a battery module closest to the traction machine (for each phase or module string) is connected either as "bypass−" or "bypass+". Contactors in connections between the strings of the AC battery and the traction machine are opened (in order to decouple the AC battery from the traction machine) and the active short-circuit contactors are closed with a time delay for this purpose. In the state machine, a "MOTOR FAULT" state is assumed, which constitutes a final state after an emergency disconnection operation. This state can be left only by virtue of a command to shut down in order to then force a restart by means of user intervention with a power-on-reset command. The user intervention is, for example, a shutdown signal via CAN.

In another embodiment of the method according to aspects of the invention, intrinsic safety of the central controller is achieved by causing a shutdown of the traction system in the following scenarios in which
    an immediate shutdown is required by an input signal,
    a zero torque is incorrectly reported, an abort fault is inferred from monitoring of the fault loop,
a measurement sensor of a phase current for the traction machine outputs an abort fault,
a plausibility check of at least two measurement sensors, for example the current sensors for the traction machine, outputs an abort fault,
an additionally arranged DC/DC converter outputs an abort fault.

In yet another embodiment of the method according to aspects of the invention, an abort fault is defined by the fact that
all current sensors fail,
all current sensors apart from one current sensor fail,
at least one fuse relating to the phase current trips,
a resolver which measures an angle of rotation of a rotor in the traction machine is faulty or an incorrect rotor position results from its signal, which in turn can be determined or is determined by plausibility monitoring,
a respective phase current is outside a permissible range (for example as a result of a wire break),
a flow of power to the traction machine is outside a permissible range.

In a further embodiment of the method according to aspects of the invention, a current sensor and a module controller with a microprocessor are arranged in each battery module. The module controller passes a trigger to the fault loop if the abort fault is detected. This trigger then causes the AC battery to be changed to the safe state, wherein the module controller of the battery module causing the trigger immediately implements the "bypass–" switching state and all other battery modules retain their current state and likewise change to the "bypass–" switching state in the next cycle without further issuing of commands. The central controller, or rather the HSB_CMD_TX IP core, detects this fault and mirrors it on further phases or module strings. The central controller then synchronously transmits the fault to all modules in each broadcast message. The module controller can in turn have a hardware-programmable processor unit on which module control software is implemented. A module state machine may also be implemented in the module control software.

An important function when carrying out the method according to aspects of the invention in this case includes, in each battery module, a program part which is implemented in the module controller and receives or executes a respective control command via the high-speed bus, said program part being referred to below as HSB_CMD_RX which is implemented as an IP core in VHDL and is executed on an FPGA. The HSB_CMD_RX is connected to the high-speed bus and can receive, for example, a broadcast message from the HSB_CMD_TX of the central controller, in which a so-called abort fault bit is set. This would then communicate the HSB_CMD_RX to the module controller in the respective battery module, which module controller then transfers the respective battery module to a protected switching state, for example "bypass–".

A possible scenario for a respective battery module to change to a protected switching state results as follows for two possible initial states: in a first initial state, the respective module controller is either not live or is currently dealing with a restart or has not been completely started up. In this case, the respective battery module is intrinsically in a "PASSIVE" state, that is to say all switches of the battery module are in a non-conductive state. Adjacent battery modules are decoupled and no current flows to the traction machine in the respective module string. Such a state is only safe if the traction machine is at a standstill, with the result that no induction voltage is possible. In a second initial state, the respective module controller ("CB" here, as a short designation for control board) has been completely started up and is controlled by the module control software. The module state machine implemented by means of the module control software can now have the following state transitions:

There is a change from the "CB_INIT" state, which was assumed after the "POR" state (short for "Power-On-Reset"), to the "bypass–" state.
There is a change from the "CB_ERROR" state, which means an occurrence of an abort fault, to the "bypass–" state.
From the "CP_RUN" state, action is taken depending on the content of a broadcast message to be received, in any case as long as the fault loop does not carry a trigger (also referred to here as "fault loop is at the top").
A change is made from the "CB_SHUTDOWN" state, which was assumed after a shutdown command from the central controller, to the "BYPASS–" state. From this state, a change is finally made to the "PASSIVE" state and the system is shut down.

Therefore, the "BYPASS–" state is finally achieved from all possible states of the module state machine.

In yet another embodiment of the method according to aspects of the invention, the AC battery has at least one peripheral unit from the following list: low-voltage DC/DC converter, current sensor for a respective phase current of the traction machine, charging plug. The at least one peripheral unit is connected to the fault loop. The at least one peripheral unit passes a trigger to the fault loop if the abort fault is detected. The trigger may also be formed by virtue of the fact that the fault loop carries a voltage signal of a certain voltage level in the fault-free case and, if a fault occurs, the fault loop of that battery module in which the fault occurs, for example, is interrupted, with the result that the voltage signal of the fault loop falls to 0 V at the central controller. An insulation monitor is a further peripheral unit which, although not resulting in an abort fault, can prevent switching on (again).

In a continued further embodiment of the method according to aspects of the invention, an FPGA is selected as the hardware-programmable processor unit, and the state machine is implemented by means of the control program on the at least one microprocessor core. FPGA is an abbreviation for a "Field Programmable Gate Array". When starting the electric vehicle having the contactor control according to aspects of the invention, for example, respective processor programming can be configured on an FPGA, which programming is considered to be a hardware implementation and can accordingly be carried out safely. At the start of operation, the control program is configured by a program loader on the hardware-programmable processor unit. The program loader which respectively newly supplies the hardware-programmable processor unit with the control program when starting operation may be, for example, a first stage boot loader, abbreviated to FSBL.

In a continued yet further embodiment of the method according to aspects of the invention, intrinsic safety of the respective battery module or its module controller is achieved by means of the following scenarios in which an input signal to the (respective) module controller indicates an abort fault since
a current sensor emits a fault message via an R5485 interface
a current sensor determines an interrupted connection voltage values outside a stipulated range are determined
a temperature sensor determines that a predefined temperature range is exceeded (for example above 86° C.)
the HSB_CMD_RX (IP core) exceeds a function duration ("timeout" of a regularly transmitted signal)
a watchdog or its measurement sensor determines a brief voltage dip (watchdog brownout detection).

A system for a safety concept for an AC battery is also described, in which the AC battery comprises a central controller, a plurality of battery modules which respectively have a power board with a plurality of switching states, a plurality of contactors, a plurality of current sensors, a fault loop and a high-speed bus and is connected to a traction machine. The central controller has a hardware-programmable processor unit with at least one microprocessor core. On the hardware-programmable processor unit, a control program is configured to control the battery modules, the plurality of contactors and the fault loop, wherein a state machine is implemented by means of the control program. The battery modules are connected, starting from the central controller, via the high-speed bus and the fault loop. In this case, if an abort fault is detected, the central controller is configured to change the AC battery to a safe operating state. This comprises requesting each battery module via the high-speed bus to assume a "bypass" switching state, ordering a respective safety switching position in each contactor and finally disconnecting the central controller.

In one configuration of the system according to aspects of the invention, an abort fault is present in the case of an event from the following list: wire break, fault loop carries a trigger, a CAN bus connected to the central controller specifies an incorrect operating state.

In another configuration of the system according to aspects of the invention, the central controller comprises a fault loop and each module comprises a further fault loop, wherein all modules on a phase are connected to the corresponding phase of the central controller. In addition, the three phases in the central controller are connected via the HSB_CMD_RX (IP core) and therefore together form a fault loop over the entire system.

In a further configuration of the system according to aspects of the invention, a current sensor and a module controller with a microprocessor are arranged in each battery module. In this case, the module controller is configured to pass the trigger to the fault loop if the abort fault is detected.

In yet another configuration of the system according to aspects of the invention, the AC battery has at least one peripheral unit from the following list that is connected to the fault loop: low-voltage DC/DC converter, current sensor for a respective phase current of the traction machine. In this case, the at least one peripheral unit is connected to the fault loop. In addition, the at least one peripheral unit is configured to pass the trigger to the fault loop if an abort fault is detected.

In a continued further configuration of the system according to aspects of the invention, the hardware-programmable processor unit is an FPGA, and the state machine is implemented by means of the control program on the at least one microprocessor core.

Further advantages and configurations of the invention emerge from the description and the accompanying drawing.

It goes without saying that the features mentioned above and the features yet to be explained below can be used not only in the respectively stated combination, but also in other combinations or alone, without departing from the scope of the present invention.

BRIEF DESCRIPTION OF THE DRAWING FIGURES

DETAILED DESCRIPTION OF THE INVENTION

Figure 1:
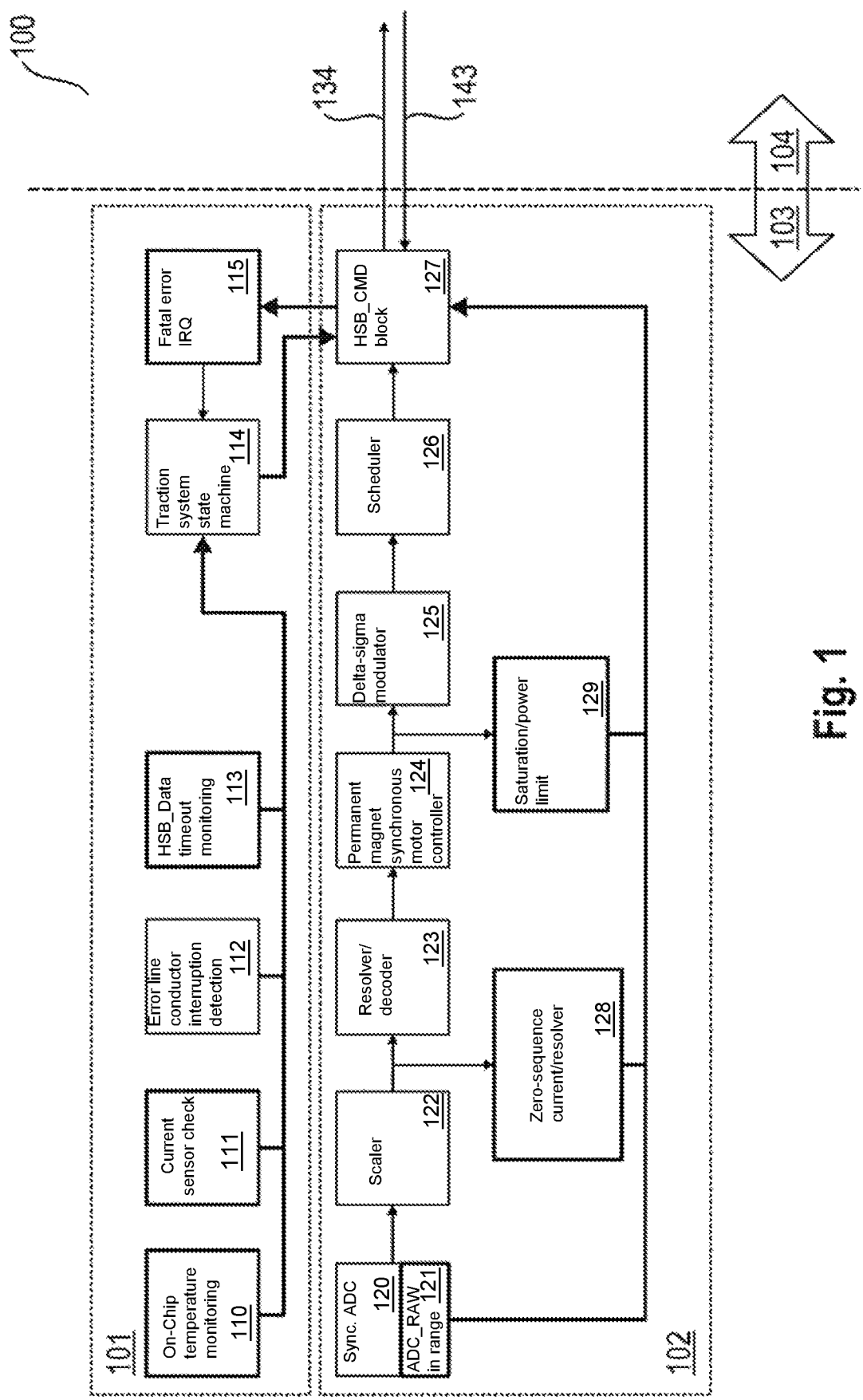
FIG. 1 shows a block diagram of a central controller for handling an abort fault in one configuration of the system according to aspects of the invention.

FIG. 1 shows a block diagram of a central controller 100 for handling an abort fault in one configuration of the system according to aspects of the invention, wherein processes 101, 102 take place on the central controller, indicated by an arrow with reference sign 103, and signals are transmitted 134, 143 to a control board, indicated by an arrow with reference sign 104. The processes 101 on at least one dedicated microprocessor of the central controller 100 are formed by monitoring devices, such as on-chip temperature monitoring 110, a current sensor check 111, error line conductor interruption detection 112, and HSB_Data timeout monitoring 113, that is to say monitoring for when a signal transmission time is exceeded in a high-speed bus for transmitting data, and report an abort fault to a traction system state machine 114. A fatal error IRQ 115, which was triggered by an HSB_CMD block 127, can also be reported to the traction system state machine 114. For its part, the traction system state machine 114 in turn reports an abort fault to the HSB_CMD block 127. The processes on a hardware-programmable processor unit 102, here an FPGA, take place by means of blocks with an analog/digital converter such as Sync. ADC 120 and "ADC_RAW within predefined range" 121 and also take place in blocks such as a scaler 122, a resolver/decoder 123, a permanent magnet synchronous motor controller 124, a delta-sigma modulator 125 and a scheduler which report an abort fault to the HSB_CMD block 127. The HSB_CMD block 127 also directly receives such an abort fault message from the "ADC_RAW signal is within the predefined range" block 121, the zero-sequence current/resolver 128 and the saturation/power limit block 129. The HSB_CMD block 127 transmits commands as HSB_CMD 134 to a control board, to which all battery modules are connected, for example, and monitors a fault loop 143 which is connected to the control board.

Figure 2:
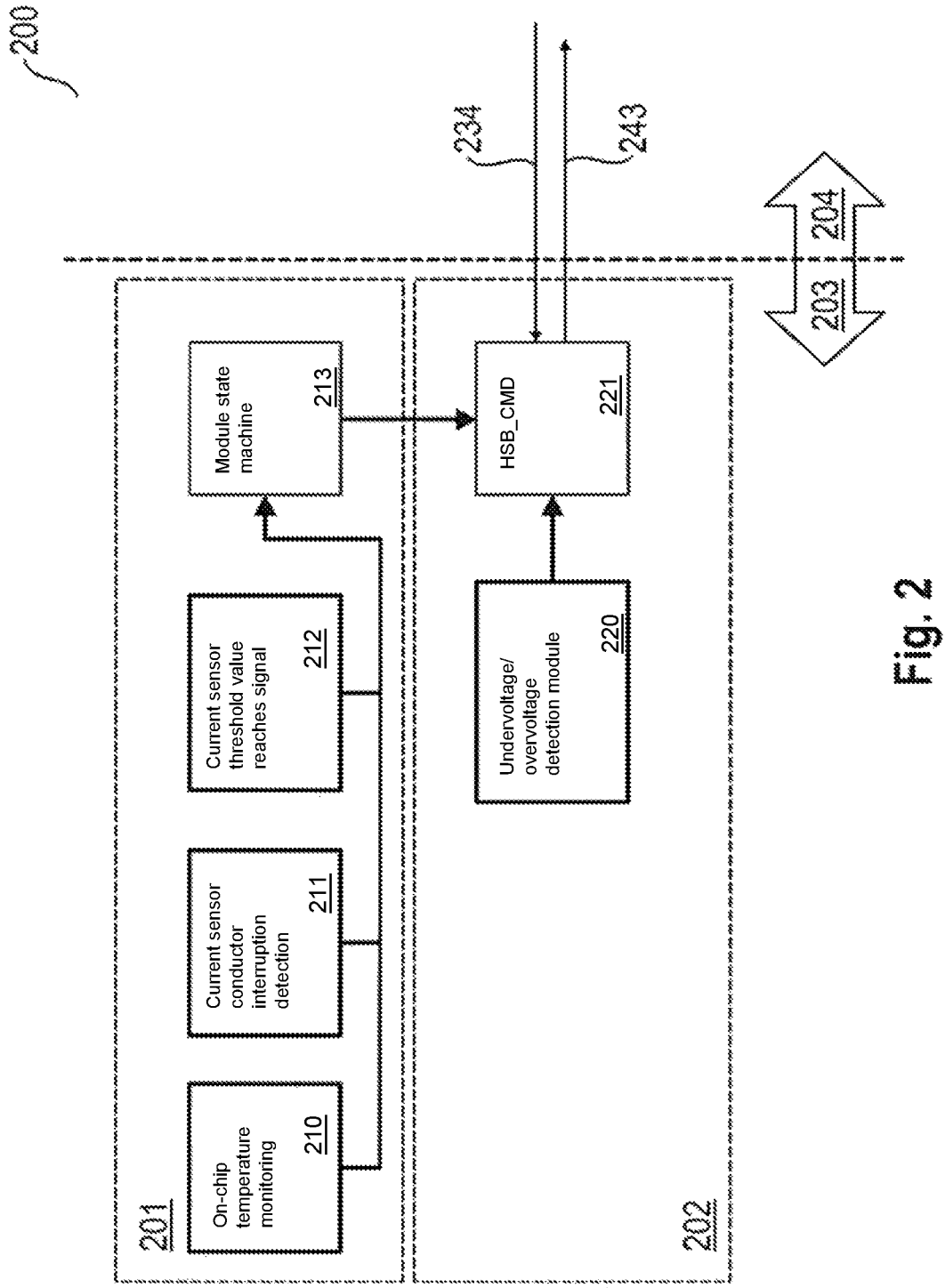
FIG. 2 shows a block diagram of a module controller for handling an abort fault in a further configuration of the system according to aspects of the invention.

FIG. 2 shows a block diagram of a module controller 200 for handling an abort fault in a further configuration of the system according to aspects of the invention, wherein processes 201, 202 take place on the module controller, indicated by an arrow with reference sign 203, and signals are transmitted 234, 243 to the control board or to electrical connections to this control board, indicated by an arrow with reference sign 204. The processes 201 on at least one dedicated microprocessor of the module controller 200 are formed by monitoring devices, such as on-chip temperature monitoring 210, current sensor conductor interruption detection 211 and a "current sensor threshold value reaches signal" block 212, and report an abort fault to a module state machine 213. For its part, the module state machine 213 in turn reports an abort fault to the HSB_CMD block 221 in the battery module. In a process on a hardware-programmable processor unit 202 of the module controller 200, also an FPGA here for example, an abort fault is reported to the HSB_CMD block 221 in the battery module by an "undervoltage/overvoltage detection" module. The HSB_CMD block 221 in the battery module receives commands as HSB_CMD 234 and is connected to a fault loop 243.

Figure 3:
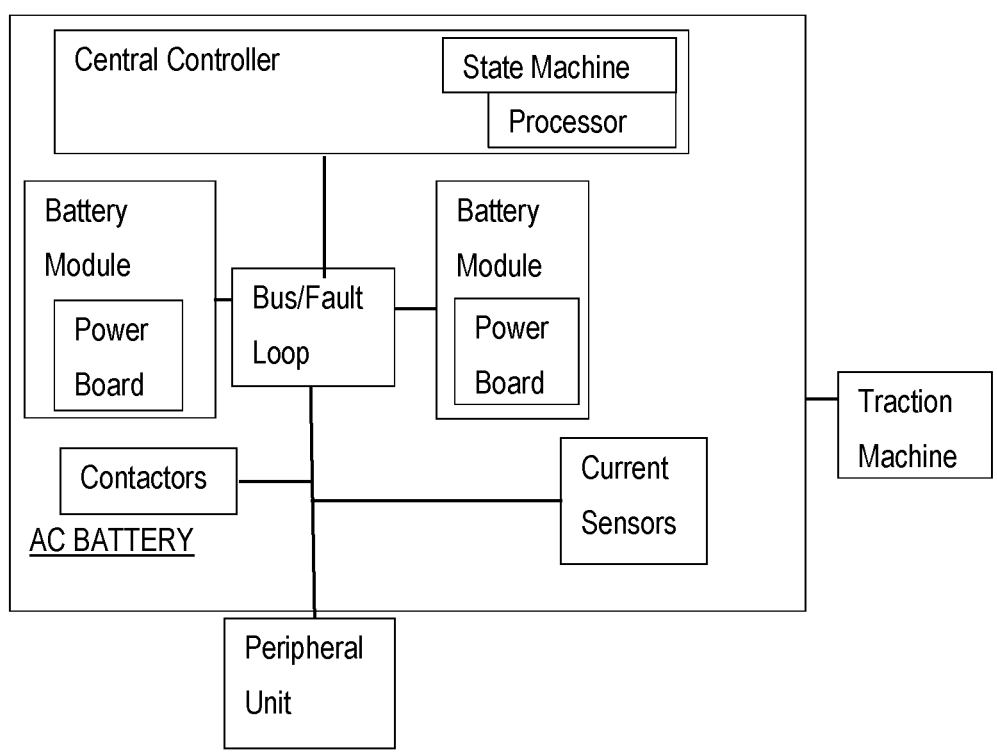
FIG. 3 shows a block diagram of the AC battery shown connected to a traction machine.

The AC battery connected to a traction machine is shown in FIG. 3.

LIST OF REFERENCE SIGNS

200 Control board fault handling
201 Processes on the microprocessor of the module controller
202 Processes on the FPGA module controller
203 Processes on the central controller
204 From the module controller to the control board
210 On-chip temperature monitoring
211 Current sensor conductor interruption detection
212 Current sensor threshold value reaches signal
213 Module state machine
220 Undervoltage/overvoltage detection module
221 HSB_CMD
234 HSB_CMD from control board
243 Error line to control board
100 Central controller
101 Processes on the microprocessor of the central controller
102 Processes on the FPGA central controller
103 Processes on the central controller
104 From the central controller to the control board
110 On-chip temperature monitoring
111 Current sensor check
112 Error line conductor interruption detection
113 HSB_Data timeout monitoring
114 Traction system state machine
115 Fatal error IRQ
120 Sync. ADC
121 ADC_RAW in range
122 Scaler
123 Resolver/decoder
124 Permanent magnet synchronous motor controller
125 Delta-sigma modulator
126 Scheduler
127 HSB_CMD block
128 Zero-sequence current/resolver
129 Saturation/power limit
134 HSB_CMD to control board
143 Fault loop of control board

What is claimed:

1. A method for a safety concept for an AC battery connected to a traction machine, in which the AC battery comprises (i) a central controller, (ii) a plurality of battery modules which are arranged in at least one string and respectively have a power board with a plurality of switching states, (iii) a plurality of contactors, (iv) a fault loop and (v) a high-speed bus,
wherein the central controller has a hardware-programmable processor unit with at least one microprocessor core on which a control program is configured to control the battery modules, the plurality of contactors and the fault loop,
wherein the battery modules are connected, starting from the central controller, via the high-speed bus and the fault loop, said method being performed by the central controller and comprising the steps of:
upon detecting an abort fault, changing the AC battery to a safe operating state by:
 requesting each battery module to assume a bypass switching state by each contactor assuming a respective safety switching position; and
 disconnecting the central controller from the fault loop, the high-speed bus, and the plurality of battery modules.

2. The method as claimed in claim 1, wherein the abort fault is obtained if an event from the following list is present: a wire break, a fault loop carries a trigger, or a CAN bus connected to the central controller specifies an incorrect operating state.

3. The method as claimed in claim 1, wherein a current sensor and a module controller with a microprocessor are arranged in each battery module, and the method comprises the module controller passing the trigger to the fault loop if the abort fault is detected.

4. The method as claimed in claim 1, wherein the AC battery has at least one peripheral unit comprising a low-voltage DC/DC converter, a current sensor for a respective phase current of the traction machine, and/or a charging plug, and
wherein the at least one peripheral unit is connected to the fault loop, and the at least one peripheral unit passes the trigger to the fault loop if the abort fault is detected.

5. The method as claimed in claim 1, wherein an FPGA is selected as the hardware-programmable processor unit, and a state machine is implemented by the control program on the at least one microprocessor core.

6. The method as claimed in claim 1, wherein at least one contactor of the plurality of contactors is a contactor arranged between a battery module string and a charging connection, and wherein the respective safety switching position of the contactor arranged between the battery module string and the charging connection is an open switching position configured to interrupt an electrical connection.

7. The method as claimed in claim 1, wherein in the bypass switching state switches of the respective power board are switched so that an energy storage element arranged in the respective battery module is bypassed when current is conducted through respective battery module connections.

8. The method as claimed in claim 1, wherein the safe operating state is at least one of idle state or quiescent state, motor operation, DC voltage charging, AC voltage charging, or switched off.

9. A system for a safety concept, the system comprising:
a traction machine;
an AC battery connected to the traction machine, the AC battery comprising a central controller, a plurality of battery modules which are arranged in at least one string and respectively have a power board with a plurality of switching states, a plurality of contactors, a plurality of current sensors, a fault loop and a high-speed bus,
wherein the central controller has a hardware-programmable processor unit with at least one microprocessor core on which a control program is configured to control the battery modules, the plurality of contactors and the fault loop,
wherein a state machine is implemented by the control program,
wherein the battery modules are connected, starting from the central controller, via the high-speed bus and the fault loop, wherein, if an abort fault is detected, the central controller is configured to change the AC battery to a safe operating state by:
  requesting each battery module via the high-speed bus to assume a bypass switching state,
  ordering a respective safety switching position in each contactor, and
  finally disconnecting the central controller from the fault loop, the high-speed bus, and the plurality of battery modules.

10. The system as claimed in claim 9, wherein the abort fault is present in the case of an event from the following list: a wire break, a fault loop carries a trigger, or a CAN bus connected to the central controller specifies an incorrect operating state.

11. The system as claimed in claim 9, wherein a current sensor and a module controller with a microprocessor are arranged in each battery module, and wherein the module controller is configured to pass the trigger to the fault loop if the abort fault is detected.

12. The system as claimed in claim 9, wherein the AC battery has at least one peripheral unit comprising a low-voltage DC/DC converter and/or a current sensor for a respective phase current of the traction machine,
  wherein the at least one peripheral unit is connected to the fault loop and the at least one peripheral unit is configured to pass the trigger to the fault loop if an abort fault is detected.

13. The system as claimed in claim 9, wherein the hardware-programmable processor unit is an FPGA, and the state machine is implemented by the control program on the at least one microprocessor core.

14. The method as claimed in claim 1, wherein, upon detecting the abort fault, a request to each battery module to assume the bypass switching state by each contactor assuming the respective safety switching position is submitted simultaneously for each battery module.

* * * * *